US010613002B2

(12) United States Patent
Fukuda

(10) Patent No.: US 10,613,002 B2
(45) Date of Patent: Apr. 7, 2020

(54) TIRE TESTING DEVICE

(71) Applicant: Kobe Steel, Ltd., Hyogo (JP)

(72) Inventor: Jumpei Fukuda, Takasago (JP)

(73) Assignee: Kobe Steel, Ltd., Hyogo (JP)

(*) Notice: Subject to any disclaimer, the term of this patent is extended or adjusted under 35 U.S.C. 154(b) by 171 days.

(21) Appl. No.: 15/322,690

(22) PCT Filed: Aug. 3, 2015

(86) PCT No.: PCT/JP2015/071975
§ 371 (c)(1),
(2) Date: Dec. 28, 2016

(87) PCT Pub. No.: WO2016/024491
PCT Pub. Date: Feb. 18, 2016

(65) Prior Publication Data
US 2017/0176295 A1 Jun. 22, 2017

(30) Foreign Application Priority Data
Aug. 12, 2014 (JP) ................. 2014-164328

(51) Int. Cl.
*G01M 17/02* (2006.01)
*B60C 25/00* (2006.01)
(Continued)

(52) U.S. Cl.
CPC ........... *G01M 17/027* (2013.01); *B60C 19/00* (2013.01); *B60C 25/002* (2013.01);
(Continued)

(58) Field of Classification Search
CPC .. G01M 17/027; G01M 17/02; G01M 17/021; B60C 19/00; B60C 25/0554; B60C 25/007; B60C 25/002
(Continued)

(56) References Cited

U.S. PATENT DOCUMENTS 4,704,900 A 11/1987 Beebe
2013/0042980 A1* 2/2013 Sotgiu .................. B60C 25/132
157/1.24
(Continued)

FOREIGN PATENT DOCUMENTS

JP H08-122220 A 5/1996
JP 2008-096152 * 4/2008 ............. G01B 11/00
(Continued)

OTHER PUBLICATIONS

Kihara, Apr. 2008, Machine translation of JP2008-096152.*
(Continued)

*Primary Examiner* — Eric S. McCall
*Assistant Examiner* — Timothy P Graves
(74) *Attorney, Agent, or Firm* — Studebaker & Brackett PC

(57) ABSTRACT

A tire testing device having a rotary drive unit that rotationally drives a tire; a load drum that has an outer peripheral surface that can come into contact with the tire being rotationally driven; a drum support mechanism that supports the load drum and relatively moves the load drum such that the tire and the outer peripheral surface of the load drum come into contact and separate; a shape sensor that detects a surface shape of the tire being rotationally driven; a drive control unit that controls the operation of the rotary drive unit, the drum support mechanism, and the shape sensor; a registration unit that stores information related to the tire test; and an input reception unit that receives, and registers, in the registration unit, information related to the tire test entered by a user prior to the tire test being conducted.

12 Claims, 3 Drawing Sheets

(51) Int. Cl.
 *B60C 25/05* (2006.01)
 *B60C 19/00* (2006.01)

(52) U.S. Cl.
 CPC ........ *B60C 25/007* (2013.01); *B60C 25/0554* (2013.01); *G01M 17/02* (2013.01); *G01M 17/021* (2013.01)

(58) Field of Classification Search
 USPC .......................................................... 73/146
 See application file for complete search history.

(56) References Cited

U.S. PATENT DOCUMENTS

| 2014/0303908 | A1* | 10/2014 | Sotgiu | G01B 21/32 |
| | | | | 702/41 |
| 2015/0168267 | A1 | 6/2015 | Takahashi et al. | |
| 2015/0338240 | A1* | 11/2015 | Jiang | G01D 5/14 |
| | | | | 324/207.25 |

FOREIGN PATENT DOCUMENTS

| JP | 2008-96152 A | 4/2008 |
| JP | 5058940 B2 | 10/2012 |
| JP | 2014-048269 A | 3/2014 |
| KR | 10-2009-0046181 A | 5/2009 |
| KR | 10-2013-0066858 A | 6/2013 |

OTHER PUBLICATIONS

International Search Report issued in PCT/JP2015/071975; dated Oct. 20, 2015.
Written Opinion issued in PCT/JP2015/071975; dated Oct. 20, 2015.
Extended European Search Report (EESR) dated Mar. 8, 2018, from corresponding EP Appl No. 15831386.6, 8 pages.

* cited by examiner

TIRE TESTING DEVICE

TECHNICAL FIELD

The present invention relates to a tire testing device for performing measurement, for example, of tire uniformity, in which shape measurement of a tread face or the like of a tire is performed.

BACKGROUND ART

A tire includes a variety of materials such as rubbers, synthetic fibers, steel cords that are laminated to form a complex structure. In a tire having such a complex laminate structure, deflection of force (Runout) may be generated during rotation of the tire. Therefore, it is necessary to ensure uniformity of a tire shape by evaluating Runout at a ground contact face of a tire, and controlling the Runout to be within a predetermined range.

Accordingly, actual tire manufacturing lines employ countermeasures such as to inspect manufactured tires for Runout on a ground contact face, for tires determined to have large Runout to be excluded from a shipment.

In this connection, for evaluation of a surface shape of a tire (in particular, shape of a tread face or a sidewall face), not only the Runout, but also, for example, characteristic values such as Bulge/Dent are used. Tires are tested also for these characteristic values such as Bulge/Dent, similarly as for the Runout, in a tire manufacturing line. Many of such measurements for Runout or Bulge/Dent (hereinafter these are together referred to as shape measurement) are performed by using a shape measurement device provided in a testing device of the tire uniformity.

For example, the shape measurement device of the Patent Document 1 has a structure which radiates a spot-like light from a light emission unit to a tread face (a surface in a ground contact portion of a tire) of a rotating tire, and detects a reflected light of the radiated light by a light receiving unit, to thereby measure a variation in a tire surface level, or evaluate a shape of a tread face of a tire on the basis of the measured height. Specifically, the shape measurement device of the Patent Document 1 is a tire uniformity testing device additionally provided with the light emission unit and the light reception unit described above, which is configure to measure a shape of a tread face or a sidewall face, before or after measuring the tire uniformity.

In this connection, a measurement condition (a test condition) in performing the shape measurement described above varies according to the type and size of a tire, and there may be a case where it is necessary to perform shape measurement under a test condition significantly different from the test condition in measuring the tire uniformity.

However, a test condition such as rotational speed or air pressure of a tire when rotating the tire, or a load applied to the tire from a load drum is programmed in advance as a parameter in a drive control unit, as a test condition for a tire uniformity test. Therefore, it is difficult for a user to change a test condition programmed in advance, in many cases. In general, a test condition such as rotational speed of a tire, air pressure of a tire, or load applied to a tire from a load drum are programmed in advance in a drive control unit by using a Programmable Logic Controller (PLC). Therefore, a user of a tire testing device cannot easily rewrite the program in the drive control unit.

Such rewriting of a program is well available for a maker who is a manufacturer. However, the rewriting works by a maker is often costly and time-consuming. Therefore, in not a few cases, it is not possible to meet a demand of a production site where a prompt response is desired.

CITATION LIST

Patent Document

Patent Document 1: JP 2014-048269 A

SUMMARY OF THE INVENTION

The present invention has been made in view of the above problems, and object of the present invention is to provide a tire testing device capable of changing a tire testing condition as desired, in a tire testing device for performing a measurement of, for example, tire uniformity.

A tire testing device according to a mode of the present invention is a tire testing device for performing a tire test on a tire, comprising a rotary drive unit for rotationally driving the tire; a load drum having an outer-circumferential face that can come into contact with the tire being rotationally driven; a drum support mechanism that supports the load drum and relatively moves the load drum such that the tire and the outer-circumferential face of the load drum come into contact with and separate from each other; a shape sensor that detects a surface shape of the tire being rotationally driven; a drive control unit that controls the operation of the rotary drive unit, the drum support mechanism, and the shape sensor; a registration unit that stores information related to the tire test; and an input reception unit that receives, and registers, in the registration unit, information related to the tire test entered by a user prior to the tire test being conducted. The drive control unit controls the operation of the rotary drive unit, the drum support mechanism, and the shape sensor, on the basis of the information related to the tire test that has been registered in the registration unit.

According to the tire testing device of the present invention, it is possible to change a tire test condition, as desired.

DESCRIPTION OF EMBODIMENTS

Hereinafter, a tire testing device according to an embodiment of the present invention will be described with reference to the drawings.

Figure 1:
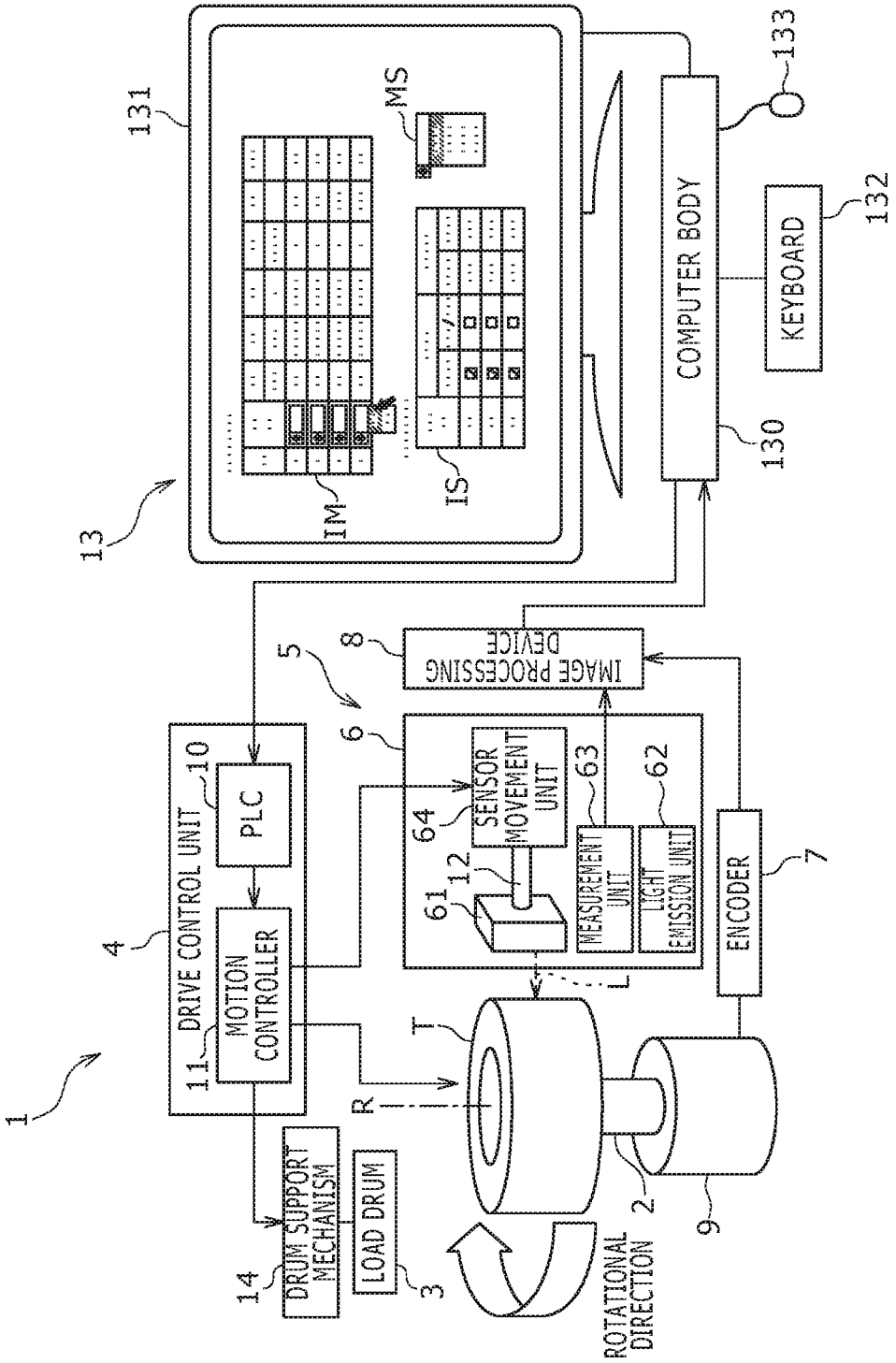
FIG. 1 is a diagram typically showing a structure of the tire testing device of the present embodiment.

FIG. 1 is a diagram typically showing a structure of the tire testing device 1 of the present embodiment. As shown in FIG. 1, the tire testing device 1 of the present embodiment comprises a spindle shaft 2, a load drum 3, a drive control unit 4, a shape measurement device 5, a drive motor 9, an input reception unit 13, and a drum support mechanism 14. The shape measurement unit 5 comprises a shape sensor 6, an encoder 7, and an image processing device 8.

As shown in FIG. 1, the spindle shaft 2 is an elongated cylindrical member having an axis R arranged in an up to down direction. The spindle shaft 2 is configured such that a tire T is attached to an upper end side of the spindle shaft 2, for example, by using a rim. The spindle shaft 2 is mounted on a rotational shaft of the drive motor 9. The drive motor 9 rotates the spindle shaft 2 and the tire T attached to the spindle shaft 2, around the axis R. The spindle shaft 2 and the drive motor 9 constitute an example of the rotary drive unit.

The load the drum 3 is a short cylindrical member with a large diameter, having an axis arranged in the up to down direction similarly as the spindle shaft 2, and an outer-circumferential face that can come into contact with the tire T attached to the spindle shaft 2. The load drum 3 is arranged in a lateral side of the spindle shaft 2. The drum support mechanism 14 supports the load drum 3, and relatively moves the load drum 3 in the horizontal direction close to and away from the axis R of the spindle shaft 2, for example, by use of a rail. Then, when the drum support mechanism 14 moves the load drum 3 close to the spindle shaft 2, the outer-circumferential face of the load drum 3 comes into contact with the tire T. When the drum support mechanism 14 moves the load drum 3 away from the spindle shaft 2, the outer-circumferential face of the load drum 3 comes away from the tire T.

The drum support mechanism 14 or the load drum 3 is provided with a load cell for measuring load acting on the shaft portion of the load drum 3. The tire testing device 1 can evaluate tire uniformity, on the basis of a load measured by the load cell.

The shape sensor 6 measures a shape of a surface of the tire T (for example, a tread face and a sidewall face). The shape sensor 6 comprises a sensor body 61, a light emission unit 62, a measurement unit 63, and a sensor movement unit 64. The sensor body 61 is formed into a plate shape, and arranged on a lateral side of the spindle shaft 2, that is, on a lateral side of a tread face of the tire T.

The light emission unit 62 and the measurement unit 63 are provided on a surface of the sensor body 61 on the side of the tire T. The light emission unit 62 irradiates a surface of the tire T with measurement light L. The measurement unit 63 receives a reflection light of the measurement light L reflected from the surface of the tire T. The measurement unit 63 calculates a distance from the shape sensor 6 (sensor body 61) to the surface of the tire T, on the basis of the received reflection light. The measurement unit 63 sends the calculated distance to the image processing device 8.

On a surface of the sensor body 61, on the opposite side of the tire T, an arm member 12 is provided. The arm member 12 is formed to protrude from a surface of the sensor body 61 toward the opposite side of the tire T. An end of the arm member 12 is mechanically connected to the sensor movement unit 64. The sensor movement unit 64 moves the sensor body 61 through the arm member 12 in an up to down direction (lateral direction) and in a front to back direction (radial direction). The sensor movement unit 64 comprises, for example, a stepping motor or a servo motor. The sensor movement unit 64 moves the arm member 12 by a specific amount in the up to down direction or in the front to back direction according to a signal from the drive control unit 4, as will be described later. As a result, the sensor movement unit 64 can move the shape sensor 6 (the sensor body 61) to a desired position on a surface of the tire T.

Incidentally, as the light emission unit 62 of the shape sensor 6 described above, the present embodiment uses a spot laser having the measurement light L having a spot-like focal point. The spot laser has a focal point diameter of about several mm. The tire testing device 1 of the present embodiment is configured to be capable of inspecting a surface of a tire T, separately into plural parts, by use of this spot laser.

If such a spot laser is used, it is possible to use a simple apparatus as the light receiving element of the measurement unit 63, and thus the cost of the shape sensor can be made low, as compared with a case of using a line laser.

The drive control unit 4 transmits a command to each unit of the tire testing device 1 to control operation of the each unit. The driving control unit 4 comprises a Programmable Logic Controller (PLC) 10, and a motion controller 11.

The command transmitted from the drive control unit 4 comprises, for example, a command related to rotational direction such as whether the spindle shaft 2 is rotated forward or reverse; a command related to rotational speed such as to what degree a rotational speed (rotational frequency) of the spindle shaft 2 is set; a command related to air pressure of the tire T attached to the spindle shaft 2; a command related to direction of movement and distance of movement of the sensor body 61; a command related to pressing load of the load drum 3 against the tire T.

The drive control unit 4 outputs a command related to rotational direction and rotational speed of the spindle shaft 2 to the drive motor 9. The drive control unit 4 also outputs a command related to air pressure of the tire T to, for example, a pressure control valve (not illustrated) of an air supply pipe which supplies air into the tire T. The drive control unit 4 also outputs a command related to direction of movement and distance of movement of the sensor body 61 to the sensor movement unit 64. The drive control unit 4 also outputs, to the drum support mechanism 14, a command related to pressing load of the load drum 3 against the tire T.

In the PLC 10 (an example of the registration unit), information related to operations such as a rotational direction and a rotational speed of the spindle shaft 2, or a direction of movement and a distance of movement of the sensor body 61 are registered. The PLC 10 sends the registered information related to operations such as a rotational direction or a rotational speed to a motion controller 11.

The motion controller 11 computes an amount of control for achieving the operations sent from the PLC 10. The motion controller 11 computes an amount of control such as level of current value of the drive motor 9. The motion controller 11 computes an amount of control such as degree of a valve opening of the pressure control valve. In a case where the sensor movement unit 64 comprises a stepping motor, the motion controller 11 computes the number of steps of a motor as the amount of control. In a case where the sensor movement unit 64 comprises a servo motor, the motion controller 11 computes a drive time of a motor as the amount of control. The motion controller 11 computes a distance of movement of the load drum 3 as the amount of control. The motion controller 11 outputs the computed amount of control as a control signal, for example, to the drive motor 9, the pressure control valve, the sensor movement unit 64, and the drum support mechanism 14.

The encoder 7 measures a rotational speed of the drive motor 9, in other words, a rotational phase of the tire T. The encoder 7 sends the measured rotational phase of the tire T to the image processing device 8.

The image processing device 8 (an example of the processing unit) produces an image of a surface shape of the tire T, or analyzes the same, on the basis of the distance from the shape sensor 6 to a surface (for example, a tread face) of the tire T, and the rotational phase of the tire T which is measured by the encoder 7. The image processing device 8 outputs a result of the imaging or the analysis to the input reception unit 13. The input reception unit 13 displays the entered result of the imaging or the analysis on a display 131.

Figure 3:
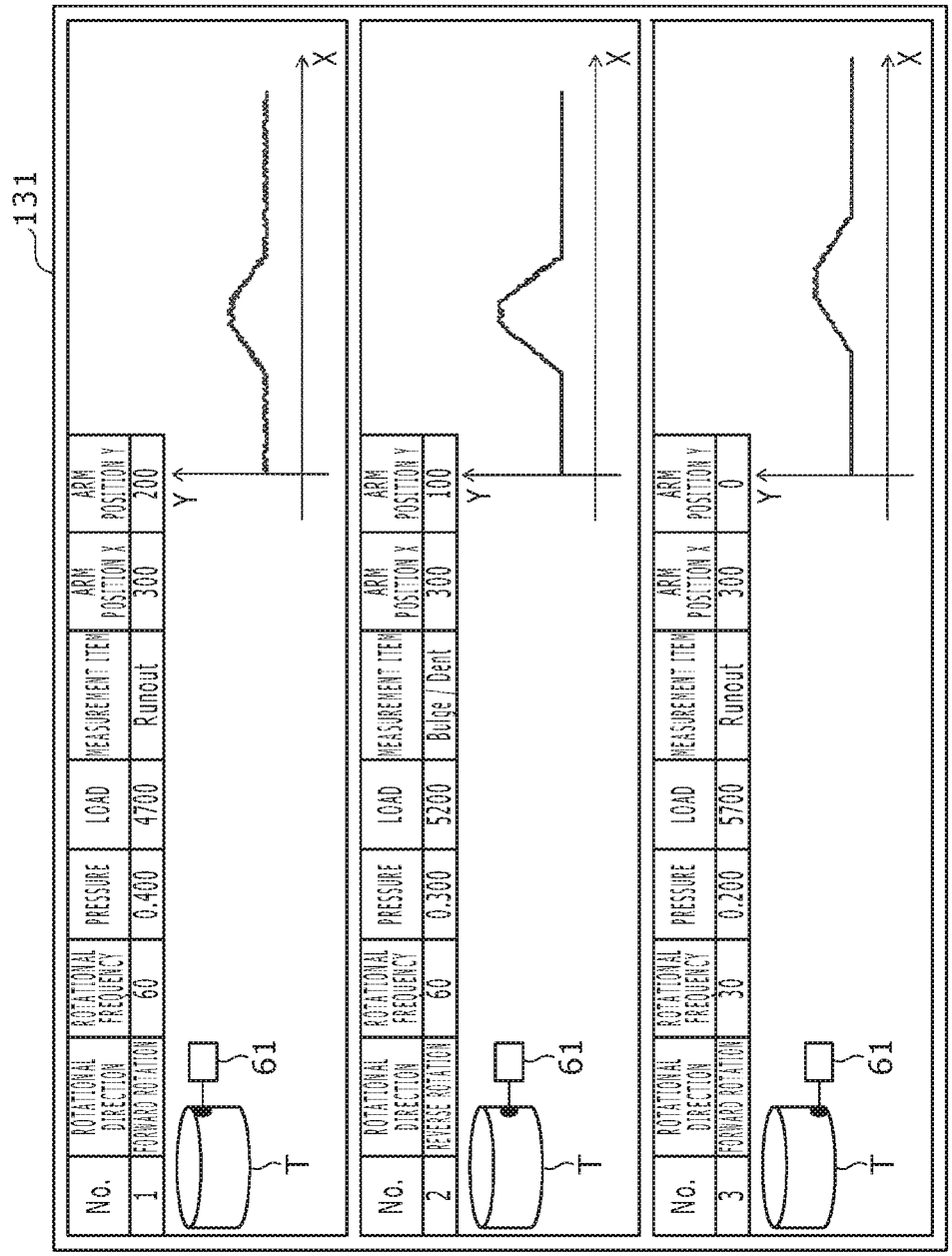
FIG. 3 is a diagram schematically showing a display example of a result of an analysis by an image processing device displayed on the display.

FIG. 3 is a diagram which schematically shows an example of displaying a result of an analysis by an image processing device 8, to be displayed on the display 131. FIG. 3 shows "rotational phase of the tire T" plotted on X-axis, and "distance from the shape sensor 6 to the tread face of the tire T" plotted on Y-axis. This shows how a radius value of the tire T from the center to the outer-circumferential face thereof changes in the circumferential direction, by a curve.

Further, the image processing device 8 computes a characteristic values representing a shape such as "Runout" and "Bulge/Dent". The "Runout" represents a distribution of radius values of the tire T from the center to the outer-circumferential face thereof. The "Bulge/Dent" represents a ratio between a protrusion and a recess formed when the tire is filled with air. Thus, the image processing device 8 analyzes a shape of the tire T.

The tire testing device 1 configured as described above rotates the spindle shaft 2 to which the tire T attached, and presses the load drum 3 against the tire T at a predetermined pressing load to measure a tire uniformity, according to the test conditions registered in the PLC 10 in advance. The image processing device 8 evaluates a characteristic value such as the "Runout" or the "Bulge/Dent" of the tire T or a change in radius value of a tread face of the tire T, by using, for example, a distance to the tire T measured at the shape sensor 6 and a rotational phase of the tire T measured by the encoder 7.

The input reception unit 13 receives information related to a tire test entered by a user before the tire test is conducted. In this embodiment, the information related to a tire test comprises inspection conditions such as a rotational speed of the tire T, an inspection item of the shape measurement, and a detecting position of the shape sensor 6 on the surface of the tire T. Incidentally, the information related to the tire test should only comprise at least one of the aforementioned three kinds of information. The input reception unit 13 transmits the received information related to the tire test to the PLC 10 of the drive control unit 4.

As such an input reception unit 13, the present embodiment uses a desktop-type personal computer. Namely, the input reception unit 13 comprises a computer body 130, a display 131, a keyboard 132, and a mouse 133. The computer body 130, the PLC 10, and the image processing device 8 are configured to be capable of communicating with one another. Incidentally, the input reception unit 13 is not limited to a desktop personal computer, but it is also possible to use a laptop personal computer, a tablet computer, or a personal digital assistant (PDA).

Figure 2:
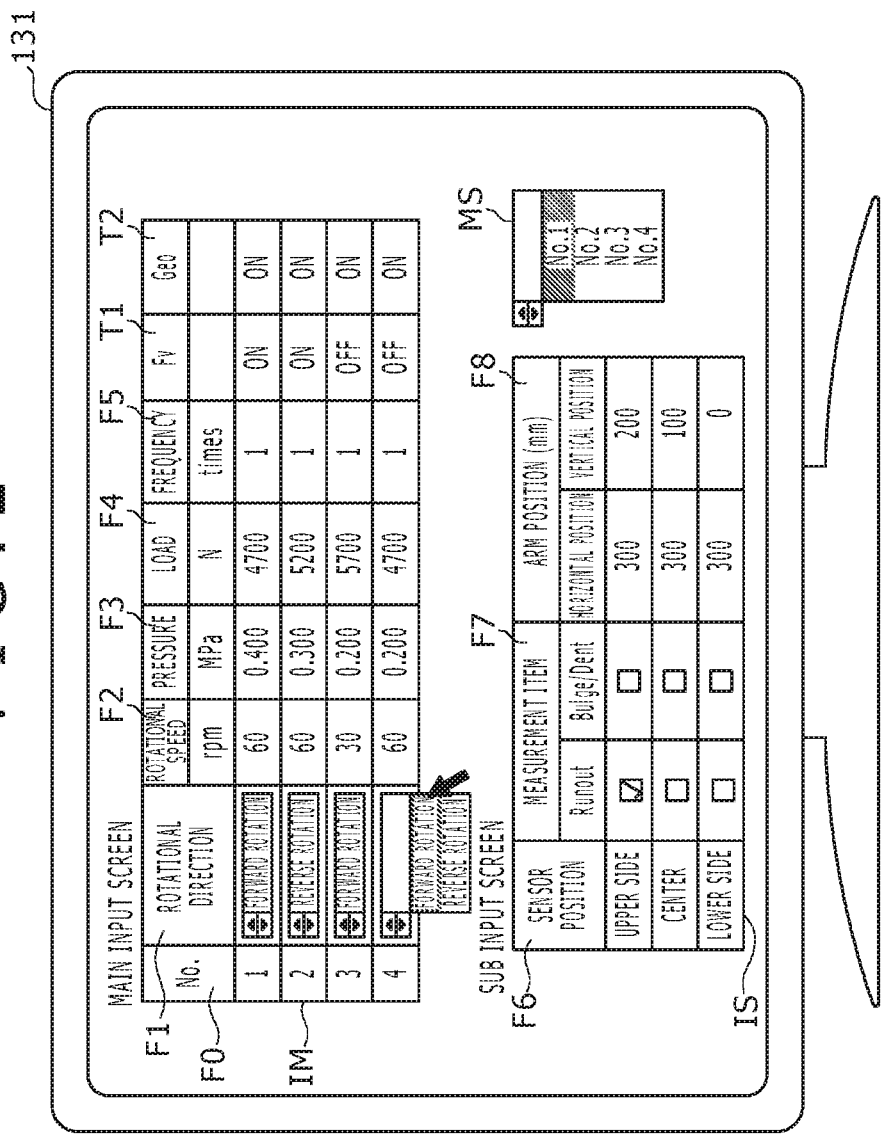
FIG. 2 is a diagram schematically showing an example of an input screen that is displayed when a user enters information related to a tire test.

FIG. 2 is a diagram schematically showing an example of an input screen that is displayed on the display 131 when a user is entering information related to a tire test. The main input screen IM displayed in the upper section of the display 131 is a screen mainly for entering an "inspection condition". The sub input screen IS displayed in the lower section of the display 131 is a screen mainly for entering an "inspection item" for each "inspection condition".

The aforementioned "inspection condition" is test conditions in performing a tire test. In the example of the main input screen IM shown in FIG. 2, the "inspection condition" comprises "rotational direction" F1, "rotational speed" F2, "pressure" F3, "load" F4, and "frequency" F5.

The "rotational direction" F1 shows whether the tire T rotates clockwise (forwardly rotates) or rotates counter-clockwise (reversely rotates) when viewed from the above. The example shown in FIG. 2 is configured such that this "rotational direction" F1 of the tire T is alternatively selected from "forward rotation" and "reverse rotation" by using the mouse 133.

The "rotational speed" F2 shows a rotational speed of the tire T. The "pressure" F3 shows an air pressure of the tire T. The "load" F4 shows a load applied to the tire T from the load drum 3. In entering the rotation speed, the pressure, or the load, etc., the mouse 133 may be used to point a predetermined column in the input screen, and the keyboard 132 may be used to type in numerical values, or the like.

The "frequency" F5 is a numerical value which shows a number of times for which the tire T is rotated during the test. A numerical value to be entered to the "frequency" F5 is generally an integer. For example, in a typical tire uniformity test, tire uniformity is measured while the tire T makes one rotation. Accordingly, numerical value of "1" is entered to the "frequency" F5.

The aforementioned "inspection items" are items to be inspected in performing a tire test. In the example of the main input screen IM shown in FIG. 2, the "inspection items" comprise "Fv" T1 and "Geo" T2.

The "Fv" is an abbreviation for Force variation, representing a tire uniformity test. The "Geo" is an abbreviation for Geometry, representing a shape measurement test. With the "Fv" T1 and the "Geo" T2, a user selects whether or not these test are to be performed. The "Fv" T1 and the "Geo" T2 are provided with an option "ON" (namely, a test is to be conducted", and an option "OFF" (namely, a test is not to be conducted". The user alternatively selects one of the options, for example, by using the mouse 133.

In the main input screen IM shown in FIG. 2, the "inspection condition" F1 to F5 and the "inspection item" T1 and T2 are entered for each "test number" F0. The "test number" F0 shows order of a test. The example of the main input screen IM shown in FIG. 2 is configured such that four inspection conditions, etc. of "No. 1" to "No. 4" can be entered at a time.

In the example of the sub input screen IS shown in FIG. 2, the "inspection conditions" comprise "sensor position" F6 and "arm position" F8, and the "inspection items" comprise "measurement item" F7. The sub input screen IS is provided for each test number F0 that is numbered as "No. 1", or the like, in the main input screen IM. That is, the sub input screen IS is configured such that "sensor position F6" and "arm position" F8 which are the "inspection conditions", and "measurement item F7" which are the "inspection items" are entered for each of the tests of the first test "No. 1" to the fourth test "No. 4". Accordingly, in the display 131, a test selection screen MS is shown on the right side of the sub input screen IS.

The test selection screen MS is a screen for switching a sub input screen displayed on the display 131, correspondingly to each of the tests of the first test "No. 1" to the fourth test "No. 4". The example of the test selection screen MS shown in FIG. 2 is configured such that the "No. 1" to the "No. 4" are alternatively selected, for example, by using the mouse 133. The test selection screen MS displays a currently selected test number, for example, with its color changed, to clearly show as being selected. In the example of the test selection screen MS shown in FIG. 2, the first test "No. 1" is currently selected.

The "sensor position" F6 represents a position to be irradiated by the measurement light L to be radiated from the shape sensor 6. In the example of FIG. 2, the "sensor position" F6 is shown as a position in the width direction (namely, the up to down direction in FIG. 1) of the tire T. As described above, the present embodiment uses a spot laser as the light emission unit 62 of the shape sensor 6. By changing position of the light emission unit 62 by the sensor movement unit 64, it is possible to change a position to be measured on the surface of the tire T where the shape measurement is performed. In the example of FIG. 2, the "sensor position" F6 has three types of "upper side", "center", and "lower side". A user may select a desired sensor position from these three types, by checking a check box of the "measurement item" F7 which will be described next.

When the "upper side" is selected as the "sensor position" F6, the shape measurement is performed on the sidewall face on the upper side of the tire T. When the "center" is selected as the "sensor position" F6, the shape measurement is performed on the tread face of the tire T. When the "lower side" is selected as the "sensor position" F6, the shape measurement is performed on the side wall face on the lower side of the tire T. With such configuration where the "sensor position" F6 is selectable, it is possible to surely specify the "sensor position" F6, in a case where it is necessary to perform the shape measurement on any one of the side wall on the upper side, the tread face, and the side wall on the lower side. Thus, in the present embodiment, it becomes possible to correctly and surely perform the shape measurement.

The "measurement item" F7 show characteristic values measured in the shape measurement. The example of the sub input screen IS shown in FIG. 2 is configured such that both "Runout" and "Bulge/Dent" described above are optional. Each of these "measurement item" F7 is provided with a check box. A user can appropriately select whether or not a measurement of the "measurement item" F7 is performed at the "sensor position" F6, by checking or unchecking the box.

The "arm position" F8 represents a position of the arm member 12 of the shape sensor 6. By the "arm position" F8, it is possible to change a position of the shape sensor 6 according to size of a tire T to be inspected, which is attached to the spindle shaft 2.

The example of the sub input screen IS shown in FIG. 2 is configured such that two numerical values of "horizontal position" and "vertical position" may be entered to the "arm position" F8. The "horizontal position" represents a position of the shape sensor 6 in the horizontal direction. When a diameter of a tire T to be attached to the spindle shaft 2 is large, a numerical value entered to the "horizontal position" will also be large. The "horizontal position" is shown, for example, on the assumption that the axis R of the spindle shaft 2 is the origin.

On the other hand, the "vertical position" represents a position of the shape sensor 6 in the up to down direction, namely, a height of the shape sensor 6. A numerical value to be entered to this "vertical position" is varied, according to width of a tire T to be attached to the spindle shaft 2. The "vertical position" is shown, for example, on the assumption that the lower end of the tire T to be attached to the spindle shaft 2 is the origin.

Incidentally, the present embodiment may be configured such that, in a case of performing the shape measurement on a side wall face on the upper side of the tire T, the light emission unit 62 of the shape sensor 6 is raised to above the upper end of the tire T attached to the spindle shaft 2, and the light emission unit 62 radiates the measurement light L toward the side wall face on the upper side which is positioned below the light emission unit 62.

On the other hand, the present embodiment may be configured such that, in a case of performing the shape measurement on a side wall face on the lower side of the tire T, the light emission unit 62 of the shape sensor 6 is lowered to below the lower end of the tire T attached to the spindle shaft 2, and the light emission unit 62 radiates the measurement light L toward the side wall face on the lower side which is positioned above the light emission unit 62.

The present embodiment may be configured such that, in a case where the "upper side" is selected as the "sensor position" F6, the shape measurement is performed on a tread face near the upper end of the tire T attached to the spindle shaft 2. The present embodiment may also be configured such that, in a case where the "center" is selected as the "sensor position" F6, the shape measurement is performed on a tread face near the center of the tire T attached to the spindle shaft 2. The present embodiment may also be configured such that, in a case where the "lower side" is selected as the "sensor position" F6, the shape measurement is performed on a tread face near the lower end of the tire T attached to the spindle shaft 2. In any of the cases, a user can perform the shape measurement at a desired position, by entering a desired numerical value to the "vertical position" of the "arm position" F8.

As described above with reference to FIG. 2, the information related to a tire test including an inspection condition, an inspection item of the shape measurement, and a detecting position of the shape sensor 6 on the surface of the tire T is displayed on the display 131 of the input reception unit 13 in a form of a table. A user may enter or select the information related to tire test, by using, for example, a keyboard 132, or a mouse 133.

Further, any of the information related to the tire test comprising an inspection condition, an inspection item of the shape measurement, and a detecting position of the shape sensor 6 on the surface of the tire T is associated with a "test number F0" of the tire T. That is, in FIG. 2, a test condition of a tire test performed in the first test is associated with information of "No. 1", and a test condition of a tire test performed in the second test is associated with information of "No. 2". In addition, it is configured such that such test number F0 of the tire T may be freely increased. The main input screen IM may be configured to be scrollable, for example, by displaying a scroll bar on the display 131. The main input screen IM may be configured such that pages can be skipped, for example, by displaying a page skip button on the display 131. It is also possible in the present embodiment to enter information related to a tire test to test numbers after "No. 4" of FIG. 2, in the same manner.

In the next place, an example of operation in the tire testing device 1 of the present embodiment will be described with reference to FIG. 1 to FIG. 3. As shown in FIG. 2, four tests having the test numbers F0 of "No. 1" to "No. 4" are to be performed in the tire test of the present embodiment.

In a case where the test number F0 is "No. 1" of FIG. 2, the motion controller 11 of the drive control unit 4 rotates the tire T, which has been supplied with compressed air so as to have an air pressure of 0.400 MPa, in a clockwise direction at a rotational speed of 60 rpm, and presses the load drum 3 against the tire T with a load of 4700 N, according to the conditions set in the main input screen. Further, when the "Runout" of the "upper side" is selected as shown in FIG. 2, from the conditions set in the sub input screen corresponding to the test number "No. 1", the motion controller 11 arranges the shape sensor 6 on the "upper side" (where the vertical position of the arm member 12 is 200 mm), according to this selection. When rotation of the tire T has become stabilized, the measurement of Runout is performed while the tire T makes one rotation. When the measurement is finished, a result of analysis by the image processing device 8 is displayed on the display 131, for example, as shown in the upper section of FIG. 3.

In "No. 2" of FIG. 2, the motion controller 11 rotates the tire T, which has been supplied with compressed air so as to have an air pressure of 0.300 MPa, in a counterclockwise direction at a rotational speed of 60 rpm, and presses the load drum 3 against the tire T with a load of 5200 N, according to the conditions set in the main input screen. Further, when the "Bulge/Dent" of the "center" is selected from the conditions set in the sub input screen corresponding to the test number "No. 2", the motion controller 11 arranges the shape sensor 6 in the "center" (where the vertical position of the arm member 12 is 100 mm), according to this selection. When rotation of the tire T has become stabilized, the measurement of Bulge/Dent is performed while the tire T makes one rotation. When the measurement is finished, a result of analysis by the image processing device 8 is displayed on the display 131, for example, as shown in the middle section of FIG. 3.

Next, in "No. 3" of FIG. 2, the motion controller 11 rotates the tire T, which has been supplied with compressed air so as to have an air pressure of 0.200 MPa, in a clockwise direction at a rotational speed of 30 rpm, and presses the load drum 3 against the tire T with a load of 5700 N, according to the conditions set in the main input screen. Further, when the "Runout" of the "lower side" is selected from the conditions set in the sub input screen corresponding to the test number "No. 3", the motion controller 11 arranges the shape sensor 6 on the "lower side" (where the vertical position of the arm member 12 is 0 mm), according to this selection. When rotation of the tire T has become stabilized, a measurement of Runout is performed while the tire T makes one rotation. When the measurement is finished, a result of analysis by the image processing device 8 is displayed on the display 131, for example, as shown in the lower section of FIG. 3.

Finally, in "No. 4" of FIG. 2, the motion controller 11 rotates the tire T, which has been supplied with compressed air so as to have an air pressure of 0.200 MPa, in a clockwise direction at a rotational speed of 60 rpm, and presses the load drum 3 against the tire T with a load of 4700 N, according to the conditions set in the main input screen. Further, the motion controller 11 arranges the shape sensor 6 according to the conditions set in the sub input screen corresponding to the test number "No. 4". When rotation of the tire T has become stabilized, the measurement of a selected measurement item is performed while the tire T makes one rotation. When the measurement is finished, a result of analysis by the image processing device 8 is displayed on the display 131 (illustration omitted)".

As described above, in the present embodiment, it is possible to register a desired inspection condition in the PLC 10, prior to the tire test, by using the input reception unit 13. Thus, according to the present embodiment, it becomes possible to easily rewrite a test condition, in such a case where it has become necessary to rewrite a test condition that has been previously registered in the PLC 10 into another test condition.

In the tire testing device 1, generally, a rotational speed when rotating the tire T, an air pressure of the tire T during rotation of the tire T, a load applied to the tire T from the load drum 3, etc. are registered in advance as test conditions of a tire uniformity test in the drive control unit 4. Therefore in the tire testing device 1, in a case of performing the shape measurement of the tire T under test conditions where, for example, an air pressure of the tire T is higher than that in a tire uniformity test, it becomes necessary that the shape measurement is performed after the test conditions are changed into test conditions different from the test conditions of the tire uniformity.

However, in a typical tire testing device for performing a tire uniformity test, a rotational speed of a tire, an air pressure of the tire, a load from a load drum to the tire, etc. are programmed in advance as parameters in the tire testing device, by using a PLC. Therefore, it is impossible for a user of the tire testing device to easily rewrite the program of the tire testing device.

To the contrary, since the tire testing device 1 of the present embodiment includes the aforementioned input reception unit 13, it is possible to easily rewrite a parameter of a test condition. Therefore, according to the tire testing device 1 of the present embodiment, it becomes possible to perform not only a test of tire uniformity, but also shape measurement of a tire, under a test condition according to a user's demand.

In particular, according to the present embodiment, in the case where the shape measurement is performed under such a condition significantly different from a test condition of tire uniformity, that is, a test condition that has been registered in the drive control unit 4 (PLC 10) is changed, or the shape measurement is newly performed with an increased rotation, it is possible to easily change or additionally register a test condition by the input reception unit 13. Thus, the tire testing device 1 is greatly improved in convenience, to promote automation of measurement.

Incidentally, it is to be understood that the embodiment disclosed herein is only exemplary in all respects, and is not to be construed as limitation. In particular, in the embodiment disclosed herein, features not explicitly disclosed, such as driving conditions, operating conditions, various parameters, and dimensions, weight, or volume of structures do not deviate from the range ordinary conducted by those skilled in the art, and values easily predictable by those skilled in the art are used.

In this connection, although the above described embodiment provides an example of using a point laser as the light emission unit 62 of the shape sensor 6, the light emission unit 62 is not limited thereto. In the tire testing device 1 of the embodiment, it is also possible to use a line laser, which radiates a linear light, as the light emission unit 62. If a line laser is used, it is possible to perform the shape measurement throughout the entire face of a tread face of the tire T, and therefore, it is possible to enhance accuracy of the shape measurement even more.

In a case that the image processing device 8 described above is formed of a personal computer, or the like, the image processing device 8 may have a function of the input reception unit 13 described above.

In this connection, the specific embodiment described above essentially involves an invention comprising the following structure.

One mode of the present invention is a tire testing device for performing a tire test on a tire, comprising a rotary drive unit for rotationally driving the tire; a load drum having an outer-circumferential face that can come into contact with the tire being rotationally driven; a drum support mechanism that supports the load drum and relatively moves the load drum such that the tire and the outer-circumferential face of the load drum come into contact with and separate from each other; a shape sensor that detects a surface shape of the tire being rotationally driven; a drive control unit that controls the operation of the rotary drive unit, the drum support mechanism, and the shape sensor; a registration unit that stores information related to the tire test; and an input reception unit that receives, and registers, in the registration unit, information related to the tire test entered by a user prior to the tire test being conducted. The drive control unit controls the operation of the rotary drive unit, the drum support mechanism, and the shape sensor, on the basis of the information related to the tire test that is registered in the registration unit.

In this mode, information related to the tire test entered by a user is received by the input reception unit, and registered in the registration unit, before the tire test is conducted. Then, operations of the rotary drive unit, the drum support mechanism, and the shape sensor are controlled on the basis of the information related to the tire test registered in the registration unit. Therefore, according to the mode, it is possible to change information related to a tire test, as desired. As a result, a user can conduct a tire test, on the basis of a desired tire test condition.

In the mode, the information related to the tire test may comprise at least one of an inspection condition in performing the tire test, an item to be inspected by using the shape sensor, and a detecting position of the shape sensor on a surface of the tire.

According to the mode, when the information related to a tire test comprises an inspection condition in performing the tire test, a desired inspection condition is registered prior to the tire test. Therefore, it is possible to conduct the tire test under a desired condition. When the information related to a tire test comprises an item to be inspected by using the shape sensor, a desired inspection item is registered prior to the tire test. Therefore, it is possible to conduct the tire test on a desired inspection item. In a case where the information related to a tire test comprises a detecting position of the shape sensor on a surface of the tire, a desired position to be detected is registered prior to the tire test. Therefore, it is possible to conduct the tire test related to a shape at the desired position on a surface of a tire.

In the mode, the drive control unit may comprise the registration unit, and the input reception unit may transfer the information related to a tire test to the drive control unit and register the information in the registration unit.

According to the mode, information related to a tire test is transferred to the drive control unit and registered in the registration unit. Accordingly, it becomes possible to conduct a tire test, on the basis of information related to the tire test as desired by a user.

In the mode, the information related to the tire test may comprise an item to be inspected by using the shape sensor; the tire testing device may further comprise a processing unit for performing a process related to the item to be inspected on the basis of a result obtained by the shape sensor; and the input reception unit may comprise a display unit for displaying a result of the process performed by the processing unit.

According to the mode, a process related to an inspection item is performed on the basis of a result obtained by a shape sensor, and a result of the process is displayed on a display unit. Therefore, a user can easily understand a result of the process.

In the mode, the input reception unit may register, in the registration unit, information related to the tire test, for the individual tire on which the tire test is to be conducted.

According to the mode, it becomes possible to register desired information related to tire test, for the individual tire on which the tire test is to be conducted. Thus, it is possible to perform a tire test under a condition appropriate to each tire.

In the mode, the shape sensor comprises a light emission unit having a point laser that radiates a point-like light toward the tire, or a line laser that radiates a linear light toward the tire; and a light reception unit for receiving a reflection light which is a light radiated from the light emission unit and reflected from the tire.

According to the mode, when the light emission unit comprises the point laser, it is possible to use a light reception unit with a simple structure, and on the other hand, when the light emission unit comprises a line laser, it is possible to improve accuracy of a tire test, since a wide area on a surface of a tire is irradiated by the line laser.

The invention claimed is:

1. A tire testing device for performing a tire test on a tire, comprising:
a rotary drive unit configured to rotationally drive the tire;
a load drum having an outer-circumferential face configured to come into contact with the outer circumferential surface of the tire being rotationally driven by the rotary drive unit;
a drum support mechanism configured to support the load drum and relatively move the load drum such that the outer circumferential surface of the tire and the outer-circumferential face of the load drum come into contact with and separate from each other;
a shape sensor configured to detect a surface shape of the tire being rotationally driven;
a drive control unit configured to control an operation of the rotary drive unit, the drum support mechanism, and the shape sensor;
a registration unit configured to store information related to the tire test; and
an input reception unit configured to receive and register, in the registration unit, the information related to the tire test entered by a user prior to the tire test being conducted,
wherein the drive control unit is configured to control the operation of the rotary drive unit, the drum support mechanism, and the shape sensor, on the basis of the information related to the tire test that is registered in the registration unit,
the information related to the tire test comprises an inspection condition in performing the tire test, an item to be inspected by using the shape sensor, and a detecting position of the shape sensor on a surface of the tire, and
said inspection condition comprises all of a set of parameters including a rotational direction of the tire, a rotational speed of the tire, an air pressure of the tire, a load applied to the tire from the load drum, and a number of times for which the tire is to be rotated during the tire test.

2. The tire testing device according to claim 1, wherein the drive control unit comprises the registration unit, and the input reception unit transfers the information related to the tire test to the drive control unit, and registers the information in the registration unit.

3. The tire testing device according to claim 1, wherein the information related to the tire test comprises an item to be inspected by using the shape sensor;
the tire testing device further comprises a processing unit configured to analyze a surface shape of the tire on the basis of the distance from the shape sensor to a surface of the tire and a rotational phase of the tire and configured to output the result of the analysis to the input reception unit; and the input reception unit comprises a display unit configured to display a result of the analysis by the processing unit.

4. The tire testing device according to claim 1, wherein the input reception unit registers, in the registration unit, the information related to the tire test for the individual tire on which the tire test is to be conducted.

5. The tire testing device according to claim 1, wherein the shape sensor comprises a light emission unit having a point laser that radiates a point-like light toward the tire, or a line laser that radiates a linear light toward the tire; and a light reception unit that receives a reflection light which is a light radiated from the light emission unit and reflected from the tire.

6. The tire testing device according to claim 1, wherein the input reception unit registers, in the registration unit, the information related to the tire test for the individual tire on which the tire test is to be conducted.

7. The tire testing device according to claim 2, wherein the input reception unit registers, in the registration unit, the information related to the tire test for the individual tire on which the tire test is to be conducted.

8. The tire testing device according to claim 3, wherein the input reception unit registers, in the registration unit, the information related to the tire test for the individual tire on which the tire test is to be conducted.

9. The tire testing device according to claim 1, wherein the shape sensor comprises a light emission unit having a point laser that radiates a point-like light toward the tire, or a line laser that radiates a linear light toward the tire; and a light reception unit that receives a reflection light which is a light radiated from the light emission unit and reflected from the tire.

10. The tire testing device according to claim 2, wherein the shape sensor comprises a light emission unit having a point laser that radiates a point-like light toward the tire, or a line laser that radiates a linear light toward the tire; and a light reception unit that receives a reflection light which is a light radiated from the light emission unit and reflected from the tire.

11. The tire testing device according to claim 3, wherein the shape sensor comprises a light emission unit having a point laser that radiates a point-like light toward the tire, or a line laser that radiates a linear light toward the tire; and a light reception unit that receives a reflection light which is a light radiated from the light emission unit and reflected from the tire.

12. A tire testing device for performing a tire test on a tire, comprising:
a rotary drive unit configured to rotationally drive the tire;
an encoder configured to measure a rotational speed of the rotary drive unit;
a load drum having an outer-circumferential face configured to come into contact with the outer circumferential surface of the tire being rotationally driven by the rotary drive unit;
a drum support mechanism configured to support the load drum and relatively move the load drum such that the outer circumferential surface of the tire and the outer-circumferential face of the load drum come into contact with and separate from each other;
a shape sensor configured to detect a surface shape of the tire being rotationally driven;
a drive control unit configured to control an operation of the rotary drive unit, the drum support mechanism, and the shape sensor;
a registration unit configured to store information related to the tire test; and
an input reception unit configured to receive and register, in the registration unit, the information related to the tire test entered by a user prior to the tire test being conducted,
wherein the drive control unit is configured to control the operation of the rotary drive unit, the drum support mechanism, and the shape sensor, on the basis of the information related to the tire test that is registered in the registration unit, and
wherein the information related to the tire test comprises an inspection condition in performing the tire test, an item to be inspected by using the shape sensor, and a detecting position of the shape sensor on a surface of the tire,
said inspection condition comprises all of a set of parameters including a rotational direction of the tire, a rotational speed of the tire, an air pressure of the tire, a load applied to the tire from the load drum, and a number of times for which the tire is to be rotated during the tire test.

\* \* \* \* \*